United States Patent Office 3,076,789
Patented Feb. 5, 1963

3,076,789
POLYAMIDES FROM DIAMINES HAVING TWO DEUTERIUM ATOMS ON BOTH CHAIN CARBONS ALPHA TO THE TWO AMINO NITROGENS
Walter E. Mochel and William H. Sharkey, Wilmington, Del., and Frederick T. Wall, Urbana, Ill., assignors to E. I. du Pont de Nemours and Company, Wilmington, Del., a corporation of Delaware
No Drawing. Filed July 23, 1957, Ser. No. 673,587
5 Claims. (Cl. 260—78)

This invention relates to a new class of diamines and to new condensation polyamides obtained therefrom. More particularly, this invention is directed to diprimary diamines in which the carbons to which the amino groups are directly bonded each carry two deuterium atoms and to the high molecular weight linear polyamides prepared therefrom. The invention also relates to shaped structures prepared from the novel polyamides.

High molecular weight film- and fiber-forming condensation polymers of dibasic acids and diamines are old and well-established products. Many of these, frequently referred to as the nylons, have obtained appreciable commercial significance because of the outstanding physical properties of the films and fibers thereof. Examples of such polymers are polyhexamethyleneadipamide, polydecamethyleneadipamide, polyhexamethylenesebacamide, and polydecamethylenesebacamide. While these polyamides afford a convenient source of fibers of outstanding qualities such as thermal stability, toughness, and strength, these products still do not exhibit as high a resistance to light degradation as is desired.

Recently, it has been discovered that diamines in which the carbon atoms alpha to amino nitrogen are completely substituted by monovalent carbon chain radicals produce polyamides of exceptional light resistivity, which polyamides exhibit substantially the same desirable physical properties of the other polyamides. These polyamides of outstanding light durability have the chain carbons immediately linked to amide nitrogens completely substituted with monovalent carbon chain radicals. While such diamines and the polyamides therefrom are of significant interest, in view of the desirable light resistivity of the polyamides, the peculiar structure of the diamines makes it necessary that the high molecular weight polyamides be prepared therefrom by methods other than the desirably cheap, simple, and straightforward thermal polycondensation of the diamine/diacid salt.

We have now discovered a new class of diamines, from which high molecular weight film- and fiber-forming polyamides can be prepared directly by the conventional thermal polycondensation of the diamine/diacid salt, which polyamides, surprisingly, exhibit the desirably high light resistivity of the aforementioned type of highly branched chain diamine polyamides. These new diamines have two deuterium atoms, i.e., substituents, on both chain carbons alpha to the two amino nitrogens. In other words, these new diamines are $\alpha,\alpha,\alpha',\alpha'$-$d_4$-diamines. Both $\alpha$-carbons, i.e., $\alpha$- and $\alpha'$-, or $\alpha$- and $\omega$-carbons, of the diamine chain are thus both completely free of hydrogen and completely free of linkage to any other carbon, except the main carbon chain of the diamine structure. The new diamines of this invention exhibit substantially the same physical properties as the non-deuterium containing diamines and can be conveniently prepared from the requisite dinitriles by reduction, either catalytically with deuterium or chemically with such convenient deuterating agents as lithium aluminum hydride-$d_4$, also referred to as lithium aluminum tetradeuteride. The outstanding light-resistant polyamides from these diamines can be prepared by conventional techniques well established in the art for the preparation of high molecular weight, film- and fiber-forming polyamides. Other than the surprisingly good light resistivity, the polyamides exhibit substantially the same desirable physical properties as the non-deuterium containing polyamides.

As is already apparent, the important and characteristic groupings of the diamines of the present invention are those portions of the diamine molecule to which the two primary amino groups are attached. These two primary amino groups are each bonded singly and separately to carbon, both of which carbons carry two deuterium substituents each and are further linked singly to the remainder of the diamine molecule. The remainder of the diamine molecule is of little significance compared to the just-defined $\alpha$- and $\alpha'$-carbons carrying the four deuterium atoms. The linkage between the $\alpha$- and $\alpha'$-carbons, so defined, to form the over-all diamine molecule can be through any organic diradical.

However, because the diamines, and also the polyamides therefrom, are more stable, a preferred class of the new $\alpha,\alpha,\alpha',\alpha'$-$d_4$-diprimary diamines are those wherein the two said deuterium-bearing $\alpha$-carbons, which each carry the primary amino groups, are together linked through an organic diradical which is free of both Zerewitinoff-active hydrogen and aliphatic unsaturation. Particularly preferred because of their being more readily available with resultant lower costs are the $\alpha,\alpha,\alpha',\alpha'$-$d_4$-diprimary diamines wherein the $\alpha$- and $\alpha'$ perdeutero carbons are linked through an organic diradical which is solely hydrocarbon.

A most outstanding class of the diamines of our invention is one in which the diamines, other than the two primary amine groups, each linked singly and directly to methylene-$d_2$, that is, dideuteromethylene groups, are wholly hydrocarbon, free of aliphatic unsaturation. In other words, the members of this most preferred class are the aliphatically saturated hydrocarbon-$\alpha,\alpha,\alpha',\alpha'$-$d_4$-diprimary diamines, which class is specifically inclusive of the alkane-, cycloalkane-, aralkane-, alkarene-, and arene-$\alpha,\alpha,\alpha',\alpha'$-$d_4$-diprimary diamines. Generally speaking, the number of atoms in the diradical joining the two dideuteroaminomethylene groups, i.e., the two aminomethylene-1,1-$d_2$ groups, is immaterial, both in the sense of the chain atoms and lateral chain substituents. However, because the necessary intermediates are more readily available, the new $\alpha,\alpha,\alpha',\alpha'$-$d_4$-diprimary diamines of the present invention will have no more than about twelve chain atoms in said diradical. Thus, the diamines will contain in the case of the preferred diamines, which are hydrocarbon except for the two aminomethylene-$d_2$ groups and possible hetero, oxa, aza, and thia chain members, no more than fourteen chain atoms, of which two are carbon, carrying the two primary amino groups.

In the case of the most preferred diamines, wherein other than the two necessary aminomethylene-1,-1-$d_2$ groups the diamines are otherwise hydrocarbon free of aliphatic unsaturation, i.e., aliphatically saturated, the diamines will contain no more than fourteen carbons. The chain length of the diradical joining the two necessary aminomethylene-1,1-$d_2$ radicals can be as short as possible, i.e., the two aminomethylene-1,1-$d_2$ radicals can be directly joined. Thus, these most preferred aliphatically saturated hydrocarbon-$\alpha,\alpha,\alpha',\alpha'$-(or alternatively $\alpha,\alpha,\omega,\omega$-)$d_4$ diprimary diamines have the structure

$$H_2NCD_2\text{---}R\text{---}CD_2NH_2$$

wherein R, when present, is a wholly hydrocarbon diradical free of aliphatic unsaturation, i.e., aliphatically saturated, of no more than twelve, and especially no more than eight, carbons.

The new diamines of the present invention wherein both carbons alpha to the two primary amino groups each carry two deuterium atoms can be readily prepared by reduction with deuterium or with lithium aluminum hydride-$d_4$ of the corresponding dinitrile. It is to be noted that in such reactions the nitrogen atom of each nitrile group becomes the primary amino nitrogen of each amine group and the carbon atom of each nitrile group becomes the α-carbon of each aminomethylene-1,1-$d_2$ group; that is, the nitrile carbon becomes the carbon to which amino nitrogen is bonded and which also carries the necessary two deuterium atoms. The necessary dinitriles for preparation of the aforesaid class of $α,α,α',α'$-$d_4$-diamines will thus have as a radical joining the two nitrile groups the same divalent radical which in the $d_4$-diamines joins the two aminomethylene-1,1-$d_2$ groups.

Reduction of the dinitriles can be conveniently achieved using lithium aluminum hydride-$d_4$ under the reaction conditions of Nystrom and Brown as illustrated in the example which will follow. Other liquid inert diluents, such as, for example, the hydrocarbon ethers, the hydrocarbons, and the like, can be used. Temperatures will generally range from 25–100° C. Reaction times will vary from a few hours to a few days.

The $d_4$-diamines can also be prepared from the corresponding nitriles by catalytic reduction with deuterium under conditions which do not promote appreciable exchange of hydrogen for deuterium. For example, there can be used deuterium and an acetic anhydride solution of the dinitrile with Adams catalyst in the manner of Carothers et al., J. Am. Chem. Soc., 47, 3051 (1925). Reduction of the dinitrile can also be effected with $D_2$ using Raney nickel made with $D_2$ and in the presence of $ND_3$.

The new $d_4$-diamines of the present invention are useful as intermediates such as, for example, in the manufacture of sequestering agents, and as hardening agents for epoxy resins. They are especially useful in the formation of high molecular weight, film- and fiber-forming condensation polymers, particularly condensation polymers with dibasic acids, i.e., the polyamides.

These new $d_4$-polyamides likewise form a part of the present invention and are of particular interest in film and fiber form because of the outstanding light durability exhibited thereby. Condensation polyamides as a broad class are well known in the art, and methods for their preparation are well documented, for instance, in U.S. Patents 2,071,251, 2,130,948, 2,708,617, and in the co-pending application of Eugene E. Magat Serial No. 226,065, filed May 12, 1951. These same references disclose generically and specifically the well-known classes of dibasic acids and amide-forming derivatives thereof, e.g., the esters, the acid halides, and the like, which, by reaction with the complementary amide-forming $d_4$-diamines of the present invention under the reaction conditions therein disclosed, will result in the high molecular weight film- and fiber-forming $d_4$-polyamides of the present invention. The last two of these references disclose, respectively, the direct formation of films and filaments and the formation of polyamides, irrespective of shape, by the interphase, aqueous, heterogeneous polycondensation of the corresponding dibasic acid halides with the respective diamines. Application of these process conditions to the $d_4$-diamines of the present invention likewise will result in the formation of the high molecular weight film- and fiber-forming $d_4$-polyamides of the present invention.

Broadly speaking, because of the cheapness of the dibasic acids versus the other reactive amide-forming derivatives thereof, e.g., the acid halides, the acids constitute the preferred complementary amide-forming reactants for use with the $d_4$-diamines to form the $d_4$-polyamides of the present invention.

Conventionally, as illustrated in more detail in the following specific example, the purified dibasic acid and the purified $d_4$-diamine of the present invention are dissolved separately in a neutral, non-reactive solvent therefor in carefully measured concentrations so that equimolar proportions are present; the two solutions are mixed hot; and the diamine/dibasic acid salt allowed to precipitate from solution on cooling. The salt is isolated by filtration, dried, and charged to a condensation polymer-forming reactor under carefully controlled oxygen-free conditions.

The reactor is then sealed and the contents heated to polyamide-forming temperatures generally in the range 200–250° C. for cycles ranging from one to six hours or longer. The reactor is then opened and, again under carefully oxygen-free conditions, heated at substantially atmospheric pressure for periods of time ranging from about one to about four hours at temperatures in the range of 240–270° C. Finally, the reactor is heated under substantially flat vacuum, that is, under as reduced a pressure as is feasible with normal production equipment, ranging down to 1 to 10 mm. of mercury or thereabouts, at temperatures in the range 240–270° C. for a final polymer-forming cycle of from about one to about four hours.

The solid polymer obtained thereby can be directly extruded in film or fiber form if desired in the melt from the reactor after the final stage. Alternatively, the polymer can be discharged from the reactor in gross form and suitably pelleted or comminuted in conventional processing equipment to the desired pebble or pellet range for molding powders and the like, or for transfer to a separate spinning machine. All such process variables and conditions are well known in the art and it is not deemed necessary to go into further detail.

As is evidenced by the above enumerated U.S. patents and applications, the nature of the dibasic acids which can be used in forming high molecular weight, linear film- and fiber-forming polyamides varies widely. There are included in this broad class dibasic acids which contain substantially straight chains between the two acid functions, branched chains, cyclic chains, straight chains with cyclic substituents, straight chains with branched substituents, and the like. The acids can contain in the chain or diradical joining the two acid groups intrachain heteroatoms, such as oxa, aza, and thia oxygen, nitrogen, and sulfur atoms. The cyclic structures can be aromatic, alicyclic, i.e., cycloaliphatic, or they can contain intracyclic heteroatoms, such as oxa, aza, and thia heteroatoms. The diradical linking the two acid functions can be saturated or unsaturated, including ethylenic and acetylenic linkages. There can also be present non-amide-forming functional substituents, such as the halogens, e.g., bromine, chlorine, fluorine, and iodine; ketone functions, such as the simple oxocarbonyl group; ether functions, including both alkoxy and aryloxy ether groups, and the like. It will be understood that the dibasic acids are to be interpreted in the broadest sense, i.e., as inclusive of carbonic acid, as well as the dicarboxylic, and other like acid functions.

Suitable specifice dibasic acids of the aforesaid generally described types include acetonedicarboxylic acid, acetylenedicarboxylic acid, adipic acid, azelaic acid, brassylic acid, α- and β-tertiary butyladipic acid, carbonic acid, 1,2-cyclo-hexanediacetic acid, cyclohexane-1,2-, 1,3-, and 1,4-dicarboxylic acids, β-cyclohexyladipic acid, cyclopentane-1,2- and -1,3-dicarboxylic acids, 1,10-decanedicarboxylic acid, 3,3'-dicarboxydipropyl ether, 2,4-dicarboxytoluene, diglycolic acid, dihydromuconic acid, 1,2- and 1,4-dihydronaphthalene-1,2 and -1,4-dicarboxylic acids, diketosebacic acid, α,α'-dimethyladipic acid, diphenylene-2,2'-, -2,4'-, and -4,4'-dicarboxylic acids, oxybis(4-benzeneacetic acid), oxybis(p-benzoic acid), diphenylolpropanediacetic acid dithiadiglycolic acid, dodecanedioic acid, glutaric acid, hendecanedioic acid, hexadecamethylenedicarboxylic acid, hexahydroterephthalic acid, 4-aza-4-ethyl-1,7-heptanedioic acid, isophthalic acid, itaconic acid, 6-ketohendecanedioic acid, 4-ketopimelic acid, 6-ketoundecanedioic acid, 2,4-pyridinedicarboxylic acid, maleic acid, malonic acid, β-methylpimelic acid, methyl succinic acid, muconic acid, naphthalene-1,2-, -1,3-, -1,4-, -1,5-, and -1,8-dicarboxylic acids, octadecanedioic acid, oxalic acid, β-phenyladipic acid, p-phenylenediacetic acid, phthalic acid, pimelic acid, 1,4-piperazinediacetic acid, sebacic acid, suberic acid, succinic acid, terephthalic acid, tetradecanedioic acid, thiodibutyric acid, xylylene-1,2-, -1,3-, and -1,4-dicarboxylic acids, and the like.

While the polyamides of the present invention are generic and the $d_4$-polyamides from the $d_4$-polyamines and dibasic acids broadly, the $d_4$-polyamides from the dicarboxylic acids which, other than the two carboxyl groups, are wholly hydrocarbon, free of aliphatic unsaturation are preferred because such dibasic acids are more readily available than others. In other words, the preferred dibasic acids to use to prepare our novel polyamides are dicarboxylic acids of the structural formula

HOOC—R—COOH wherein R, when present, is used to represent a divalent hydrocarbon radical free of aliphatic unsaturation, i.e., aliphatically saturated, of no more than fourteen carbons and most preferably of no more than ten carbons.

Inasmuch as the present invention is generic to the $d_4$-polyamides from the $d_4$-diamines, mixtures of the $d_4$-diamines can be used as well as can mixtures of the $d_4$-diamines with the conventional hydrocarbon diamines of the same structure without the four $\alpha$ and $\alpha'$-deuterium atoms. Mixtures of the dibasic acids can likewise be used.

The presence of mixtures of the dicarboxylic acids, the $d_4$-diamines, and/or the $d_4$- and non-deuterium-containing diamines generally tends to result in a lower melting polyamides. The light durability of the polyamides is highest when no combined non-deuterium-containing diamine units are present.

The polyamides of the present invention are of outstanding utility because of the extremely high light durability exhibited thereby. This makes them of especial significance in the formation of films and fibers, the latter for processing into fabrics, wherein severe light exposure conditions are encountered. Suitable examples of these were outsanding light durability affords a premium market for the polyamides of the present invention are in such large-scale uses as automobile convertible tops, drapery material, curtains, awnings, material for shading prime tobacco designed for cigar wrappers, and parachute material, particularly for use at extremely high altitudes where radiation levels are noticeably higher.

While the polyamides herein described are most useful in the form of filaments and fibers, many other valuable artificially shaped objects can be prepared from them by suitable modification of the general methods herein described. For example, films, foils, sheets, ribbons, bands, rods, hollow tubing, and the like can also be prepared from them. In general, however, these products are not clear but are translucent or opaque. In these various applications the polyamides can be used alone or in admixture with other ingredients, such as cellulose derivatives, resins, plasticizers, pigments, dyes, antioxidants, and the like.

Although the polyamides of our invention are normally lustrous, their luster can be reduced or destroyed by various means. The most satisfactory method for preparing these fibers from a polyamide or polyamide solution containing dispersed therein a finely divided substance which is inert toward the polyamide, is incompatible therewith at ordinary temperatures, and has an index of refraction differing from that of the polyamide. Pigment-like materials are generally good delusterants. As examples of such delusterants might be mentioned titanium dioxide, zinc oxide, zinc sulfide, barium sulfate, carbon black, and copper phthalocyanine pigment. However, many organic compounds, e.g., non-phenolic polynuclear compounds, also function as delusterants.

The nature of this invention will be better understood by reference to the following illustrative example wherein parts given are by weight. It will be appreciated that this multi-part example is not intended to limit the invention, since the invention is susceptible to modifications without departure from the letter and spirit of the appended claims.

EXAMPLE I

*Part A.—Preparation of 1,10-Decane-1,1,10,10,-$d_4$-Diamine*

To a solution of 24.5 parts of lithium aluminum tetradeuteride, i.e., lithium aluminum hydride-$d_4$, in about 550 parts of anhydrous diethyl ether (dried over sodium ribbon and distilled over lithium aluminum hydride) was added with stirring over a period of 2.5 hours a solution of 76.5 parts of sebaconitrile, i.e., 1,8-octanedicarbonitrile, in about 400 parts of anhydrous diethyl ether. During this addition and subsequent hydrolysis there was maintained in the reaction apparatus a nitrogen atmosphere at a slight positive pressure (i.e., slightly greater than the external atmospheric pressure). The resultant reaction mixture was stirred for an additional half hour at room temperature, allowed to stand overnight at room temperature, and then stirred for eight hours at the reflux. The last two procedures were repeated, and the reaction mixture then was allowed to stand at room temperature for two days.

The glass reactor was then packed in ice and 40 parts of water was added gradually with stirring over a period of about one hour, the addition having been regulated to prevent an excessive rate of solvent reflux. There was then added slowly with stirring 135 parts of a 40% aqueous solution of sodium hydroxide. The resultant ether layer was separated and the remaining thick, pasty, aqueous reaction mixture was extracted with about 900 parts of ether in four portions. The original ether layer and extracts were then combined and placed over anhydrous magnesium sulfate. After standing for two days, the latter was removed by filtration, and the diethyl ether was removed from the filtrate by distillation.

The residue was then separated by precision fractionation through a spinning band distillation column of the type described in U.S. Patent 2,712,520. There was thus obtained 29.5 parts of crude product, boiling from 137° C. to a peak of 163° C. at pressures corresponding to about 10 mm. of mercury. Redistillation through the same column afforded 20.3 parts of pure 1,10-decane-1,1,10,10-$d_4$-diamine, i.e., 1,10-decamethylene-1,1,10,10-$d_4$-diamine, as a clear, colorless liquid, boiling at 137° C. at a pressure corresponding to 10 mm. of mercury.

*Analysis.*—Calc'd. for $C_{10}H_{20}D_4N_2$: C, 68.1%; H+D, 16.0%; N, 15.9%; N.E., 88.2. Found: C, 67.9%, 67.8%; H+D, 15.6%, 15.2%; N, 16.5%, 16.6%; N.E., 88.8, 88.7.

*Part B.—Preparation of Poly-1,10-Decamethylene-1,1,10,10-$d_4$-Adipamide*

A cylindrical glass reactor for polymer preparation under pressure approximately six diameters long with a tubular glass stem half the diameter of the cylinder in width and about 12½ reactor diameters long was charged with 3.6480 parts of 1,10-decane-1,1,10,10-$d_4$-diamine, i.e., 1,10-decamethylene-1,1,10,10-$d_4$-diamine, 6.1480 parts of diphenyl adipate and three parts of crystalline phenol. The charged reactor was then flushed thoroughly with dry nitrogen, evacuated, and the outer end of the glass stem then sealed. The reactor was then immersed in a metal bath leaving the emergent stem to serve as an air-cooled reflux condenser. The reactor was heated in this fashion at 200–210° C. for a period of four hours, during which time the charge became quite viscous. The reactor was then cooled, the stem opened, and equipped with a receiver for distillate.

The reactor was then heated in a vapor bath at 255° C. under nitrogen at atmospheric pressure for 0.5 hour and then under reduced pressure (2–3 mm. of mercury) with constant pumping for another half hour. During these heating cycles phenol distilled out of the reaction mixture, leaving a very viscous, frothy polymer which was then heated under ntirogen at atmospheric pressure in a vapor bath at 285° C. for 0.25 hour to obtain a more compact polymer plug and then allowed to cool under nitrogen.

There was thus obtained 5.5 parts of poly-1,10-decamethylene-1,1,10,10-d$_4$-adipamide, which can alternatively be described as poly-1,1,10,10-tetradeutero-1,10-decamethyleneadipamide, as a tough, high molecular weight polymer exhibiting an inherent viscosity in m-cresol at 0.5% concentration of 1.41 and a stick temperature of 233° C. It will be understood that stick temperature refers to the lowest temperature at which a liquid trail of polymer is left when a sample of the polymer is drawn across a heated, polished, copper block.

*Part C.—Preparation of Poly-1,10-Decamethyleneadipamide*

For comparative purposes, a polymer was prepared in a comparable fashion to that just described above from a charge of 3.8621 parts of 1,10-decamethylenediamine, 6.6532 parts of diphenyl adipate, and three parts of crystalline phenol. The only variations in the procedure were mild changes in the heating cycle, viz., two hours at 210° C. for the sealed cycle, 0.25 hour under nitrogen at 255° C., and 0.5 hour under a pressure corresponding to 2–3 mm. of mercury, and finally melting into a solid plug at 255° C. for 0.2 hour. There was thus obtained 5.5 parts of poly-1,10-decamethyleneadipamide exhibiting an inherent viscosity in m-cresol at 0.5% concentration of 1.26 and a stick temperature of 232° C.

*Part D.—Comparison of Poly-1,10-Decamethyleneadipamide and Poly-1,10-Decamethylene-1,1,10,10-d$_4$-Adipamide*

Examination of the infrared spectra of the two polymers as obtained from films about two mils thick, using a Perkin-Elmer Model 21 double beam spectrometer having a sodium chloride lens, showed the spectrum of the deuterium-containing polyamide to exhibit all the bands of the poly-1,10-decamethyleneadipamide control plus characteristic bands for the carbon-deuterium bond at 4.55µ and at 4.75µ. In addition, bands, for which no formal assignment has yet been established, were found in the spectrum of the deuterium-containing polyamide at 8.75µ, 9.75µ, and 10.85µ, which bands were not present in the spectrum of the control poly-1,10-decamethyleneadipamide.

Films of the above-poly-1,10-decamethylene-1,1,10,10-d$_4$-adipamide and the control poly-1,10-decamethyleneadipamide were exposed simultaneously in an Atlas Single Arc FDAR Fade-Ometer. In this test, resistance of the polymer to decrease in molecular weight during exposure is a measure of the sunlight durability of the polymer. The changes in molecular weight of the polyamides were determined by comparing inherent viscosities before exposure with those of the polyamides after exposure in the Fade-Ometer for periods of 200, 500, and 1000 hours.

As is shown in the following table, the poly-1,10-decamethylene-1,1,10,10-d$_4$-adipamide had outstanding resistance to light degradation, showing substantially no change in 200 hours' exposure, after which time the inherent viscosity of the control had decreased 37%. After 500 hours' exposure, the deuterium-containing polyamide was only one-eighth as degraded as the control, and after 1000 hours' exposure the deuterium-containing polyamide was only one-third as degraded as the control. Furthermore, films of the deuterium-containing polyamide retained flexibility and toughness during exposure; whereas, films of the control polyamide were rapidly embrittled.

|  | Polydecamethylene-1,1,10,10-d$_4$-adipamide | Polydecamethyleneadipamide |
|---|---|---|
| Initial inherent viscosity [1] | 1.40 | 1.26 |
| After 200 hrs. exposure: | | |
|   Inherent viscosity | 1.38 | 0.79 |
|   Percent loss in inherent viscosity | 0 | 37 |
| After 500 hrs. exposure: | | |
|   Inherent viscosity | 1.32 | 0.66 |
|   Percent loss in inherent viscosity | 6 | 48 |
| After 1,000 hrs. exposure: | | |
|   Inherent viscosity | 1.06 | 0.33 |
|   Percent loss in inherent viscosity | 23 | 74 |

[1] Viscosities determined in m-cresol solution at 25° C. at a concentration of 0.5 gram of polymer per 100 cc. of solution. The inherent viscosity is defined by the following expression:

$$\frac{\ln(\eta_{rel})}{c} = \eta_{inh}.$$

where $\eta_{rel}$ represents the ratio of the viscosity of the solution to the viscosity of the pure solvent and $C$ is the concentration of the polymer in units of grams per cc.

*Part E.—Comparison of Outdoor Durability of Poly-1,-10-Decamethyleneadipamide and Polydecamethylene-1,1,10,10-d$_4$-Adipamide*

A film of poly-1,10-demacethylene-1,1,10,10-d$_4$-adipamide, having an inherent viscosity of 1.40, was exposed outdoors in Wilmington, Delaware, for 80 days (May 4–July 23). At the end of that time the film was not noticeably altered physically and the inherent viscosity of the polyamide had only decreased 15% to 1.19. In contrast simultaneous exposure of a poly-1,10-decamethyleneadipamide control (inherent viscosity 1.26) for the same period resulted in severe embrittlement and a major decrease (62%) in inherent viscosity of the polyamide to a value of only 0.48.

*Part F.—Preparation of Poly-1,10-Decamethylene-1,1,-10,10-d$_4$-Adipamide by Salt Fusion*

Another sample of 1,10-decane-1,1,10,10-d$_4$-diamine of Part A, above, was redistilled through a precision fractionation column and a heart cut boiling at 124.0–124.5° C. under a pressure corresponding to 8 mm. of mercury was taken. Two parts of this purified diamine in about seven parts of absolute ethanol was added to a solution of 1.66 parts of purified adipic acid in about 25 parts of hot absolute ethanol. The resultant solution was cooled in an ice water bath and the solid crystalline salt which separated was removed by filtration and dried in a vacuum oven at 60° C.

The pure 1,10-decamethylene-1,1,10,10-d$_4$-diammonium adipate thus prepared was charged into a polymerization reacton as described in detail in Parts B and C above, and a polymer-forming cycle of two hours at 225° C. sealed, 1.5 hours at 255° C. under 1 atmosphere of nitrogen, and 1.5 hours at 255° C. under vacuum was carried out, also as above. There was thus obtained a tough, opaque, poly-1,10-decamethylene-1,1,10,10-d$_4$-adipamide exhibiting a softening point of 230° C.

A similar polymer preparation was carried out, using the adipate salt obtained as above from a solution of nine parts of 1,10-decamethylene-1,1,10,10-d$_4$-diamine in about 30 parts of absolute ethanol and 7.45 parts of pure adipic acid in about 100 parts of hot absolute ethanol. The polymer-forming reaction conditions were the same. There was thus obtained 12.7 parts of a tough, opaque, spinnable poly-1,10-decamethylene-1,1,10,10-d$_4$-adipamide exhibiting an inherent viscosity of 0.71.

As illustrative of the more preferred type which, other than the two amino nitrogens and the four deuterium atoms, are wholly aliphatically saturated hydrocarbon of from 2 to 14 carbons, there may be mentioned those wherein the two aminomethylene-1,1-d$_2$ radicals are directly linked together, i.e., 1,2-ethane-1,1,2,2-d$_4$-diamine; those wherein the two aminomethylene-1,1-d$_2$ radicals are directly linked through a saturated aliphatic hydrocarbon chain of 1 to 12 carbons, i.e., of the structural formula $$H_2NCD_2(CH_2)_xCD_2NH_2$$

where $x$ is an integer from 1 to 12, e.g., 1,3-propane-1,1,3,3-$d_4$-diamine, 1,14-tetradecane-1,1,14,14-$d_4$-diamine, and the like; those containing a branched chain saturated aliphatic diradical joining the two aminomethylene-1,1-$d_2$ groups, i.e., of the structural formula $$H_2NCD_2\text{---}\left[\begin{array}{c}R\\|\\C\\|\\R\end{array}\right]_n\text{---}CD_2NH_2$$

wherein the R's which can be alike or different are hydrogen or saturated aliphatic hydrocarbon, at least one R being the latter, and $n$ is an integer such that the total number of carbons in $$\left[\begin{array}{c}R\\|\\C\\|\\R\end{array}\right]_n$$

is not greater than twelve, e.g., 3,4-dimethyl-1,6-hexane-1,1,6,6-$d_4$-diamine, 4,4-dimethyl-1,7-heptane-1,1,7,7-$d_4$-diamine and the like; those wherein the hydrocarbon diradical joining the two aminomethylene-1,1-$d_2$ groups contains an aromatic ring, either as an intrachain unit or as a lateral substituent on the main carbon chain, e.g., 2-phenyl-1,3-propane-1,1,3,3-$d_4$-diamine, 1,4-benzenebis-(methyl-$d_2$-amine); those wherein the aliphatically saturated hydrocarbon chain joining the two aminomethylene-1,1-$d_2$ radicals contains a cycloaliphatic unit either as a substituent pendent on the main carbon chain of the diradical or as an intrachain component thereof, e.g., 2-cyclohexyl-1,3-propane-1,1,3,3-$d_4$-diamine, 1,4-cyclohexanebis(ethyl-$\alpha,\alpha$-$d_2$-amine), and the like.

The embodiments of the invention in which an exclusive property or privilege is claimed are defined as follows:

1. A film and fiber-forming polyamide exhibiting outstanding light durability and consisting essentially of the condensation product of a dibasic carboxylic acid and a diprimary $\alpha,\alpha,\alpha',\alpha'$-tetradeuterodiamine of the formula $$H_2NCD_2R_nCD_2NH_2$$

wherein $n$ is a cardinal number from 0 to 1, D represents deuterium and when $n$ is 1, R is an aliphatically saturated hydrocarbon diradical of 1 to 12 carbon atoms.

2. A polyamide as set forth in claim 1 wherein R is an aliphatically saturated hydrocarbon diradical of 1 to 8 carbon atoms.

3. Poly-1,1,10,10-tetradeutero-1,10-decamethyleneadipamide.

4. A polyamide of claim 1 in the form of a film.

5. A polyamide of claim 1 in the form of a fiber.

References Cited in the file of this patent

UNITED STATES PATENTS

| | | |
|---|---|---|
| 2,128,741 | Fisk | Aug. 30, 1938 |
| 2,130,523 | Carothers | Sept. 20, 1938 |
| 2,252,555 | Carothers | Aug. 12, 1941 |
| 2,460,733 | Bruson | Feb. 1, 1949 |
| 2,856,387 | Jacobson et al. | Oct. 14, 1958 |

OTHER REFERENCES

Parkington: "A Text-Book of Inorganic Chemistry," Sixth Ed., Macmillan and Co., Ltd., London, page 176 (1950).